United States Patent
Whalen et al.

[11] Patent Number: 5,824,250
[45] Date of Patent: Oct. 20, 1998

[54] GEL CAST MOLDING WITH FUGITIVE MOLDS

[75] Inventors: Philip J. Whalen, Sparta; Vikram R. Jamalabad, Somerville, both of N.J.; John P. Pollinger, Redondo Beach, Calif.; Mukesh Agarwala, Highland Park; Stephen C. Danforth, Belle Mead, both of N.J.

[73] Assignee: AlliedSignal Inc., Morris Township, N.J.

[21] Appl. No.: 672,858

[22] Filed: Jun. 28, 1996

[51] Int. Cl.⁶ .................................................. C04B 33/28
[52] U.S. Cl. ..................... 264/219; 264/221; 264/317; 264/401; 264/621
[58] Field of Search ........................ 264/219, 317, 264/401, 221, 621

[56] References Cited

U.S. PATENT DOCUMENTS

| | | |
|---|---|---|
| 4,575,330 | 3/1986 | Hull ...................................... 425/174.4 |
| 4,665,492 | 5/1987 | Masters .................................... 364/468 |
| 5,134,569 | 7/1992 | Masters ............................... 364/474.24 |
| 5,277,241 | 1/1994 | Schneider ................................ 264/222 |
| 5,298,204 | 3/1994 | O'Connor ................................ 264/221 |
| 5,439,622 | 8/1995 | Pennisi .................................... 264/219 |
| 5,546,313 | 8/1996 | Masters .................................... 264/219 |

Primary Examiner—James Derrington
Attorney, Agent, or Firm—John R. Rafter

[57] ABSTRACT

A ceramic component is manufactured rapidly using a mold made directly from a solid freeform manufacturing process. Solid freeform fabrication, or rapid prototyping, procedures are used to generate molds of materials that are soluble or otherwise fugitive. A gel casting suspension containing ceramic and emulsifying agents is poured into the cavity of the mold and caused to set. The mold is then removed by dissolution or heat treatment, leaving intact the gelcast part. Conventional procedures are then utilized to densify the gelcast component to the required final component. Time consuming and expensive machine tooling procedures are virtually eliminated. Ceramic components are generated rapidly in a cost effective manner.

11 Claims, 2 Drawing Sheets

GEL CAST MOLDING WITH FUGITIVE MOLDS

BACKGROUND OF THE INVENTION

1. Field of the Invention

The present invention relates to ceramic components and to the tooling and mold design used in manufacture thereof More specifically, the invention relates to the rapid manufacture of net shape, complex ceramic components.

2. Description of the Prior Art

The development of complex shaped ceramic structural components and devices is severely hampered by the high cost of both ceramic prototype manufacturing and short production runs. The high cost of machining needed to shape sintered, fully dense ceramic articles has led to the development of many net shape fabrication techniques. Net shape ceramic fabrication processes such as injection molding, slip casting, and gelcasting all require some form of tooling. The overall cost of a component will in many cases be driven by the cost of this fabrication tooling. Costly and time consuming machining operations are required to prepare the tooling whether they be used to prepare positives from which the tooling is subsequently made or used directly to fabricate the tool. The necessity of this tooling also precludes the use of iterative approaches in design since changes in component design require significantly high levels of re-investment in time and capital. Tool-less net shape fabrication approaches do exist such as computer controlled, bisque machining of ceramic components, but the allowable complexity of the part produced by this technique is limited by the bisque machining operation.

The different net shape ceramic fabrication techniques require different types of tooling. Water cooled, metal molds are typically used for ceramic injection molding. Porous tooling is needed to remove the solvent in ceramic slip casting operations. Ceramic gelcasting is a process whereby a ceramic slurry containing appropriate monomers is poured into a tool and then "gelled" through a catalyzed reaction which polymerizes the monomer, resulting in a rigid solid. Both metal and wax tooling have been used for ceramic gelcasting. Metal tooling is fabricated by complex machining operations. Wax tooling is fabricated in a multi-step process involving the machining or casting of positives. In each case, the tool fabrication process is very time consuming and costly. In addition, in the case of gelcasting, the use of fugitive polymer molds enables the fabrication of very complex shapes since the tooling doesn't have to be disassembled after the part is formed; it is simply dissolved or evaporated.

There is a need in the art for a ceramic component manufacturing technique that will (a) rapidly incorporate design changes to improve a component, (b) enable the manufacture of complex, non-machineable, non-castable or non-injectable shapes and (c) provide a relatively inexpensive method for the manufacture of small quantity complex shaped ceramic components.

SUMMARY OF THE INVENTION

The present invention provides a process wherein gelcast tooling is fabricated using rapid manufacturing techniques. Fugitive tooling is fabricated directly from a CAD file, significantly reducing the time and cost of fabricating complex net shape ceramic components. Machining of the fabricated components is virtually eliminated. Changes in component design are readily accommodated without additional capital equipment investments and the time and cost of part production is significantly reduced. Manufacture of ceramic components is effected rapidly in a cost effective manner.

Generally stated, the invention provides a net shape ceramic component manufacturing process comprising the steps of: (a) generating from a CAD file a rapid prototype format computer model of the ceramic component which accounts for part shrinkage during sintering; (b) preparing a fugitive mold of the ceramic component using a rapid prototyping technique based on the model generated in step (a); (c) gelcasting ceramic slurry into the mold of step (b) and heating it to cause gelation of the component; (d) removing the gelled component from the mold by dissolution in a solvent or decomposition by heating; and (e) processing the formed component into a dense functional component by drying and sintering.

More specifically, the process of the invention provides for the direct fabrication of molds from standard Rapid Prototyping machines, such as Stratasys Inc.'s 3D-Modeler™ and FDM1600™, Sanders Prototype Inc.'s MM-6PRO™, Helisys Inc's LOM™, and the like, of material such as wax, thermoplastics or the like, that is soluble in water or a solvent or fugitive. Complex parts are manufactured using multipart molds, which can be fused together. Mold generation is accomplished by any means; so long as the material of the mold can be separated from the gelcast article without mold disassembly by dissolution, melting, or evaporation. Critical features of the mold material include non-reactivity with the gelcast slurry, inexpensive and a low thermal expansion. In addition, the process of the invention requires the step of pouring the gelcasting slurry into the cavity of the mold and elevating the temperature of the mold and slurry to ensure gelation. The critical features of the mold material in this step are that it retains its shape and strength on heating. Further, the invention includes the step of removing the gelled material from the mold by melting, evaporation, or dissolution of the mold without damaging the part. During this step, physical means of mold removal are not used. Upon being removed from the mold, the formed gelcast product is subjected to conventional drying and sintering processes to achieve full functionality.

Significant advantages are provided by the process of this invention. No machining is required in the fabrication of complex ceramic components. Rapid manufacturing in accordance with the process of the invention permits a component designer to rapidly iterate part design by generating molds with varying component parameters. Defects and part rejection caused by problems with mold disassembly do not occur. The molds are fugitive and can be removed by heating or dissolution in a solvent. Doing away with physical means of removal ensures that thin sections and delicate protrusions are not damaged. The fugitive nature of the tooling enables the fabrication of complex shaped components that can't be fabricated in any other manner.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF THE PREFERRED EMBODIMENTS

Figure 1:
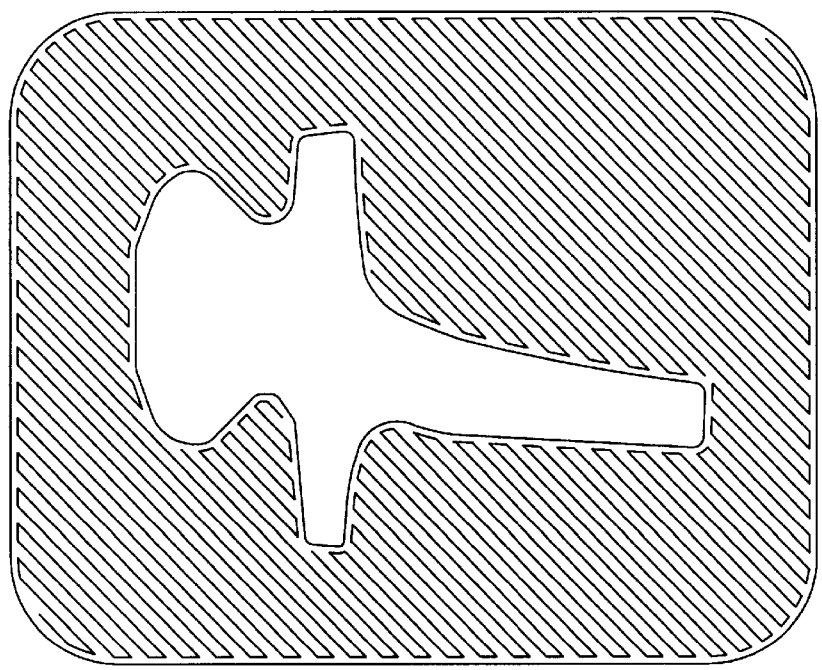
FIG. 1 is a cross section of a single slice of an RP mold showing the cavity for the casting.

The present invention provides a method for manufacturing ceramic components in a rapid and inexpensive manner. Complex shaped parts that are very difficult to machine, slip cast or injection mold can be manufactured by this method.

A CAD model of the desired article is converted to rapid prototype standard (.STL) format and then sized to account for shrinkage during drying and sintering. Commercial software is used to design a tool for the part using the STL file giving consideration for part orientation to minimize unsupported overhangs and "blind" sections of the mold where air might be entrapped during casting. Support structures of a different material (typically water or solvent soluble) are added where needed. Commercially available Solid Freeform Fabrication (SFF) techniques, such as FDM™ by Stratasys Inc., Sanders Prototype Inc., LOM™ by Helisys Inc., BPM™ by BPM Inc., DSPC™ by Soligen Inc, SLS™ by DTM Inc., SLA™ by 3D Systems Inc. and the like, are used to generate molds of fugitive polymer based materials such as investment casting wax (ICW) or acrylonitrile butadiene styrene (ABS), paper, plastic, nylon, polycarbonate, UV resins. The molds may be single piece molds or multi component molds that are fused together using specific bonding agents or solvents. ICW mold pieces are fused together with molten wax while ABS parts are fused together with commercially available ABS glue. Multi part molds become necessary where large overhangs call for excessive support structures or enclosed portions are described where the removal of support structures is not possible in some RP techniques. For multipart molds, locating holes are designed along with the molds to ensure a proper fit and registry.

The design of the mold is such that the body is in a honeycombed structure while the mold surface is solid. This ensures that the cavity is watertight while the surface area to volume ratio of the mold is high to aid in mold removal by dissolution or evaporation and cut down on mold build times. Gating systems, runners and risers are designed into the mold prior to building. The entire mold (or several molds or sections of molds to be joined together) are built at one time using RP machines. After the removal of any overhang support material, the mold is checked for watertightness by allowing water to sit in the cavity for an hour.

The gelcasting ceramic slurry is poured into the cavity of the mold carefully to ensure that all air pockets are removed. Both vacuum de-airing and vibration can be used to aid in removing bubbles. Once the mold cavity is flooded with the slurry, the temperature of the mold is elevated to speed up the gelation process. After gelation is complete, the entire mold/gel component is placed into a solvent. The solvent dissolves the mold, (solvent must not swell the mold material) leaving the formed ceramic article behind. The ceramic component is dried and then sintered to full density using standard procedures.

This invention provides solutions to costly ceramic manufacturing by (a) exploiting the "fixtureless" manufacturing capabilities of RP manufacturing techniques to allow for design changes in components, (b) building molds for components with thin, non-machineable sections or complex non-injectable protrusions and (c) reducing the manufacturing costs by directly fabricating fugitive molds for gelcasting of ceramic slurries.

The invention is not limited to any one ceramic material or to the listed RP techniques and materials demonstrated. The novelty of the procedure is in utilizing directly manufactured molds that are fugitive in the sense that they are removed by thermal treatment or by dissolution in solvents and that do not react with the ceramic gelcast slurry in the range of temperatures required for processing.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A ceramic turbine blade computer model file (3D Systems StereoLithography standard ".stl" file) was input into Quickslice™ software, available on Stratsys, Inc. FDM™ RP machines, to create the tool path for the fabrication of gelcast tooling. The part was oriented so that the airfoil was vertical in space which eliminated the need for any support structures in the mold. A tool path was designed to lay down a set of roads which followed the part geometry just outside the surface of the part. This first set or roads formed the "cavity" of the mold. The shell created by these roads was supported by a fully dense structure built around the cavity resulting in a box shaped outer mold, as shown by FIG. 1. In this first example, this structure outside the mold cavity was constructed using a build pattern that resulted in fully dense mold material with no gaps. The slice thickness used was 0.01 inch with road widths of 0.02 inches for both the outer perimeter and internal fill. Each mold took about 3 to 4 hours to build by fused deposition modeling on a Stratasys 3D Modeler and using ICW04 wax material. The total size of the mold was approximately 4 cm×4 cm×2.5 cm. The turbine blade was 2.2 cm in height, 1.2 cm in width and 2.8 cm in length. A silicon nitride gelcasting slurry was poured into the mold and heated to 45 C. to gel the article. After gelation, the mold was dissolved by placing it in a trichloroethylene bath. The remaining ceramic article was of good quality and faithfully reproduced the turbine blade features and could be further processed using standard sintering procedures.

EXAMPLE 2

A ceramic turbine blade computer model file (3D Systems StereoLithography standard ".stl" file) was enlarged in size by 30% to account for part shrinkage during densification (actual shrinkages are more in the range of 16 to 18%). QuickSlice™ software was used to create the tool path for the building of the mold for the blade component. Once again the part was oriented so that support would not be required to build the mold. A 0.006" slice thickness was used. The entire set of slices was offset out by 0.2" to create a shell of curves outside the "part" curves while still keeping the original set of slices. A dense, solid mold bottom (0.2") was formed by adding additional slices to the bottom. A slurry reservoir was added to the top of the mold by adding additional slices to raise the top 0.2".

Figure 2:
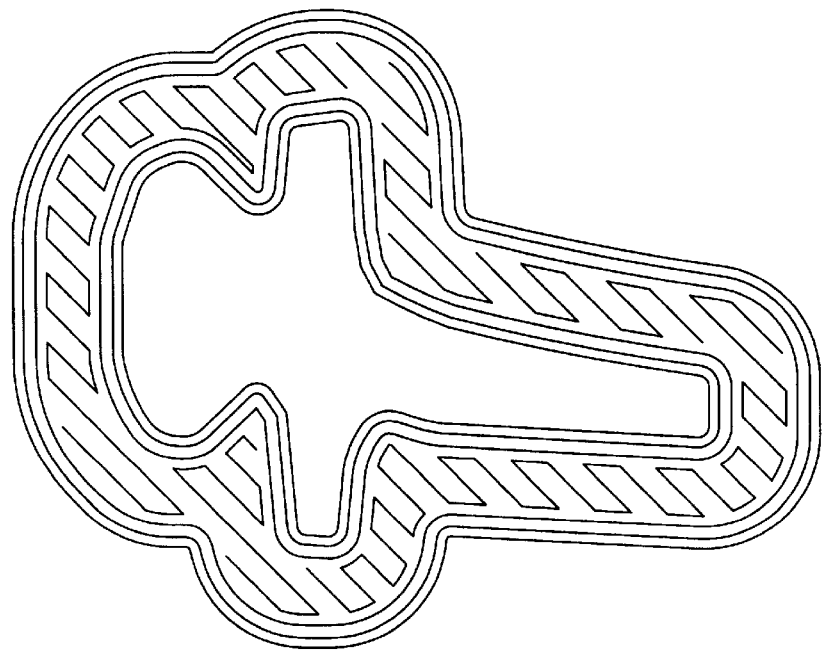
FIG. 2 is a cross section of a single slice of the RP mold showing the honeycombed structure outside the mold cavity and a reduced mold body.
Figure 3:
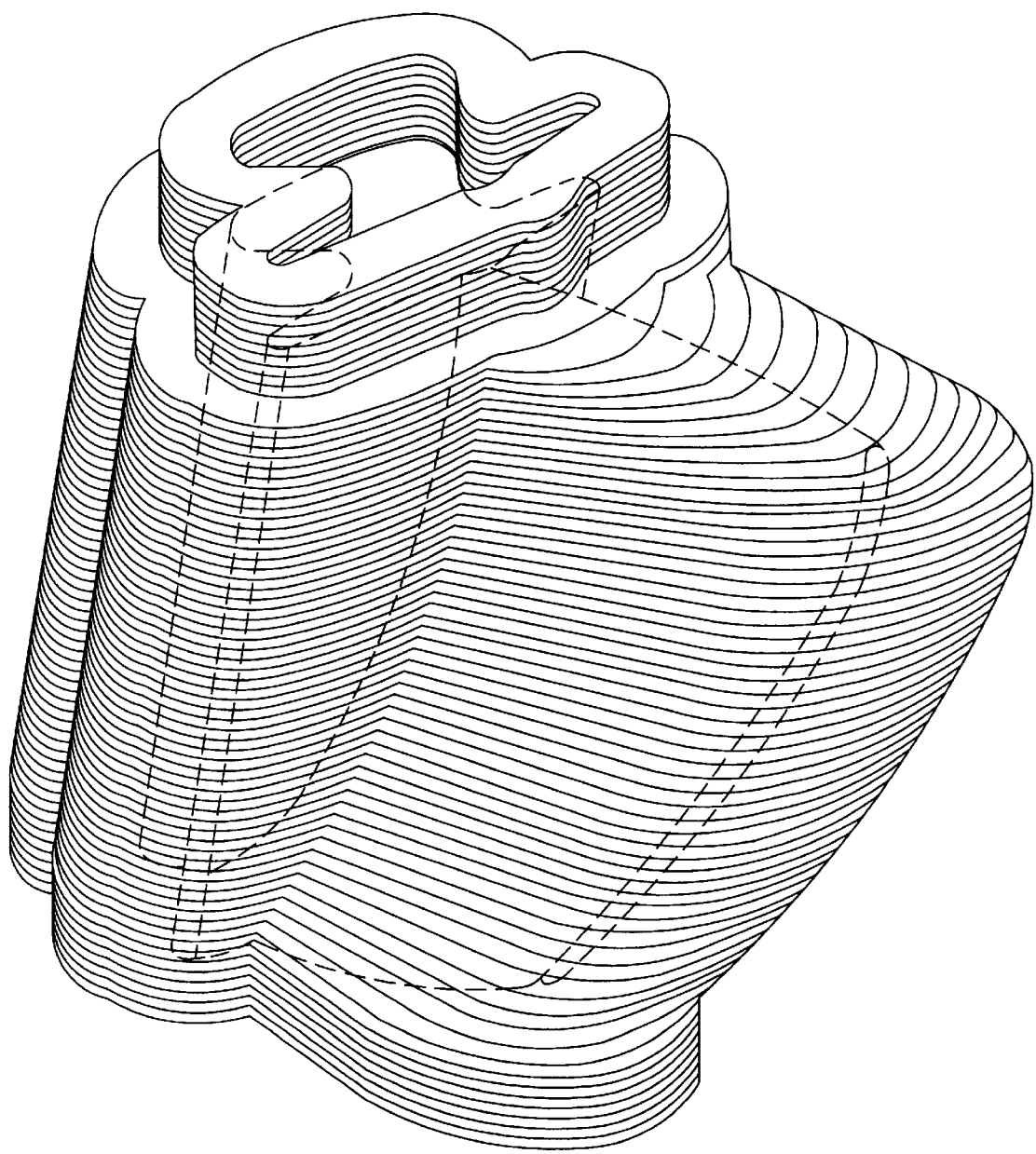
FIG. 3 is a schematic of a ceramic turbine blade in a gel cast RP mold.

The fill pattern of the mold model, between the inner cavity surface and the exterior surface was then designed. Each layer of the mold was built with a double perimeter, as is standard practice, to ensure a relatively smooth surface. The interior of the mold was filled in two separate patterns. The base of the cavity was filled with a regular raster pattern with a negative inter-road (or inter-bead) gap of 0.001" on the contact surface and 0.002" on the layer below. This overfill ensured that the bottom of the mold would be of maximum density to prevent leakage of the slurry. The mold walls and the base were built with a positive 0.020" gap to make the mold "honeycombed" and ensure a high surface area to volume ratio. This honeycombed structure is easily dissolved or volatilized in the mold removal step. In addition, the design of this mold, where the structure of the mold is honeycombed and only about 0.2" thick, minimizes the build time, (see FIG. 2). A cast blade in this mold is shown in FIG. 3.

This particular mold was fabricated using fused deposition modeling on a 3D Modeler™, available from Stratasys Inc. of Eden Prairie, Minn. using an investment casting wax (ICW05). Up to as many as four molds were fabricated at one time using this particular design.

Each of the molds was then checked for watertightness by filling the cavity with water and allowing it to stand for an hour. Any leakage from the bottom of the mold was sealed using modeling clay. After the integrity of the molds was established, the molds were used to gelcast silicon nitride components. A slurry of the silicon nitride composition containing the necessary gelcasting additives was poured into the molds. The molds were agitated to remove all air bubbles and the temperature of the mold was elevated to around 45° C. After gelation, the entire mold/cast object was immersed in a vat of trichloroethylene and agitated until the mold dissolved. The gelcast green parts were then removed from the solution and dried. Once dried, the parts were suitable for sintering procedures that are conventional for gelcast parts.

EXAMPLE 3

A CAD file of a ceramic stator nozzle doublet design was converted to an .STL file. The .STL file was used to design a three piece mold comprised of a bottom plate with the outline of the lower support of the nozzle. A center section containing the airfoils and a top section containing the top support plate and a slurry reservoir. The mold was built of acetonitrile butadiene styrene on an FDM 1600 Stratasys Inc. FDM™ machine in a manner similar to the one described in EXAMPLE 2. Road widths of 0.020" were used with a negative gap of 0.001" between roads. The mold was approximately 2.5 cm×2.5 cm×7 cm in size. The mold was fused together using ABS glue (IPS Corp's Weld.On 1707). This glue was also used to eliminate any pores or voids that may exist on the contact surface of the mold. The mold segments were aligned using locating pin holes designed into the mold. The advantage of ABS over ICW05 is its stiffness and ability to withstand higher temperatures without deforming. Use of higher temperatures reduces gelation time of the ceramic slurry.

EXAMPLE 4

A CAD file of a large (6 cm airfoils) stator nozzle doublet was used to create an .STL file of the component. A multi-part (5 sections) mold was built (at Fab Tek Inc, Oxford, Conn.) of acetonitrile butadiene styrene on an FDM1600. Road widths of 0.021" with negative gaps of 0.003" were employed for the dense mold cavity surfaces. The main body of the mold contained roads of 0.021" with a positive gap of 0.020" with 2 contour fills of 0.028". Slice thickness was maintained at 0.010". The build time for the entire mold was 14.5 hours. The alignment of the mold pieces was achieved by locating the front surfaces of all five pieces against a flat surface. ABS glue was used to join the sections together.

EXAMPLE 5

The same CAD files used in Examples 1 and 3 were used to create .STL files for two new turbine blade and nozzle mold designs. The two molds were built using ballistic particle manufacturing on a Sanders Prototype Inc MM-6PRO and the standard SPI thermoplastic (melts at 115 C.). This machine has two nozzles for laying down support structure of one material and actual build material of another. The advantage of this approach is that single piece complex molds can be fabricated containing complex overhangs and undercuts. The support structure is easily removed using a solvent (Bioact VSO from Petrafirm, Fla.) in an ultrasonic bath. The mold material itself is removed using acetone or trichloroethylene after the ceramic article is formed. The excellent precision of this technique also results in much smoother surface finishes in the tool material.

Having thus described the invention in rather full detail, it will be understood that such detail need not be strictly adhered to but that various changes and modifications may suggest themselves to one skilled in the art, all falling within the scope of the invention as defined by the subjoining claims.

What is claimed is:

1. A process for manufacture of a net shape ceramic component, comprising the 5 steps of:
    (a) generating a rapid prototype format computer model of a ceramic component from a CAD file, said model being designed to account for part shrinkage during sintering;
    (b) preparing a fugitive mold for the ceramic component using rapid prototyping based on the model generated in step (a);
    (c) gelcasting ceramic slurry into the mold of step (b) and heating the mold to cause gelation of the component;
    (d) removing the component from the mold by dissolution of the mold in a solvent or decomposition of the mold by heating; and
    (e) processing the formed component into a dense functional component by drying and sintering.

2. A process as recited by claim 1, wherein the fugitive mold material is selected from the group consisting of a wax and a polymer.

3. A process as recited by claim 1, wherein the fugitive mold has a dense watertight inner cavity and a low density honeycombed surrounding structure.

4. A process as recited by claim 1, wherein the mold is fabricated in several segments and then assembled together using heat or glue.

5. A process as recited by claim 1, wherein the mold is fabricated by a method selected from the group consisting of fused deposition modeling, ballistic particle impact, and layered manufacturing procedures.

6. A process as recited by claim 1, wherein the mold is fabricated using dissolvable support structures.

7. A process as recited by claim 1, wherein the ceramic gelcasting slurry is silicon nitride based.

8. A process as recited by claim 1, wherein the mold is removed from the ceramic component by a method selected from the group consisting of dissolution in organic solvents and volatilization using application of heat.

9. A process as recited in claim 2, wherein the fugitive mold material is investment casting wax.

10. A process as recited by claim 2, wherein the fugitive mold material is acrylonitrile butadiene styrene.

11. A process as recited by claim 8, wherein the organic solvent is selected from the group consisting of trichloroethylene, acetone, and toluene.

* * * * *